(12) United States Patent
Guo et al.

(10) Patent No.: US 10,996,894 B2
(45) Date of Patent: May 4, 2021

(54) APPLICATION STORAGE SEGMENTATION REALLOCATION

(71) Applicant: International Business Machines Corporation, Armonk, NY (US)

(72) Inventors: Ying Z. Guo, Palatine, IL (US); Praveen Viraraghavan, Chicago, IL (US); Ilya Volvovski, Chicago, IL (US); Benjamin L. Martin, Chicago, IL (US); Manish Motwani, Chicago, IL (US); Andrew D. Baptist, Mt. Pleasant, WI (US); Jordan H. Williams, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/514,207

(22) Filed: Jul. 17, 2019

(65) Prior Publication Data

US 2021/0019083 A1    Jan. 21, 2021

(51) Int. Cl.
*G06F 3/06* (2006.01)
*G06F 11/10* (2006.01)

(52) U.S. Cl.
CPC .......... *G06F 3/0659* (2013.01); *G06F 3/0604* (2013.01); *G06F 3/067* (2013.01); *G06F 3/0644* (2013.01); *G06F 11/1076* (2013.01)

(58) Field of Classification Search
CPC ...... G06F 3/0604; G06F 3/0644; G06F 3/067; G06F 3/0614; G06F 3/0683; G06F 2212/263; G06F 2212/403; G06F 2212/1032; G06F 2212/154; G06F 11/1076

See application file for complete search history.

(56) References Cited

U.S. PATENT DOCUMENTS

| | | | |
|---|---|---|---|
| 6,263,459 B1 * | 7/2001 | Schibilla | G11B 20/1883 714/710 |
| 9,766,980 B1 * | 9/2017 | Anantharaman | G06F 11/1076 |
| 10,241,692 B2 | 3/2019 | Dhuse et al. | |
| 2010/0125751 A1 * | 5/2010 | McKean | G06F 11/2094 714/5.1 |

(Continued)

OTHER PUBLICATIONS

Giannakopoulos et al.: Cloud Application Deployment with Transient Failure Recovery: Journal of Cloud Computing: Advances, Systems and Applications; 2018; 20 pages.

*Primary Examiner* — Tracy A Warren
(74) *Attorney, Agent, or Firm* — James Nock; Andrew D. Wright; Roberts Calderon Safran & Cole, P.C.

(57) ABSTRACT

A method begins or continues by a computing device of a dispersed storage network (DSN) determining an error with a first write request in a first zone of a plurality of zones of a memory device of a storage unit of DSN, where the first zone includes a first set of sequential blocks that are in a first logical and physical location of the memory device. The method continues with the computing device abandoning pending write requests to the first zone. The method continues with reassigning the first write request to a second zone of the memory device, where the second zone includes a second set of sequential blocks that are in a second logical and physical location of the memory device.

20 Claims, 12 Drawing Sheets

(56) References Cited

U.S. PATENT DOCUMENTS

| | | | |
|---|---|---|---|
| 2012/0110038 A1* | 5/2012 | Volvovski | G06F 3/0652 707/822 |
| 2015/0269025 A1* | 9/2015 | Krishnamurthy | G06F 3/0689 714/6.24 |
| 2018/0121132 A1 | 5/2018 | Bukiet et al. | |
| 2018/0246670 A1 | 8/2018 | Baptist et al. | |

* cited by examiner

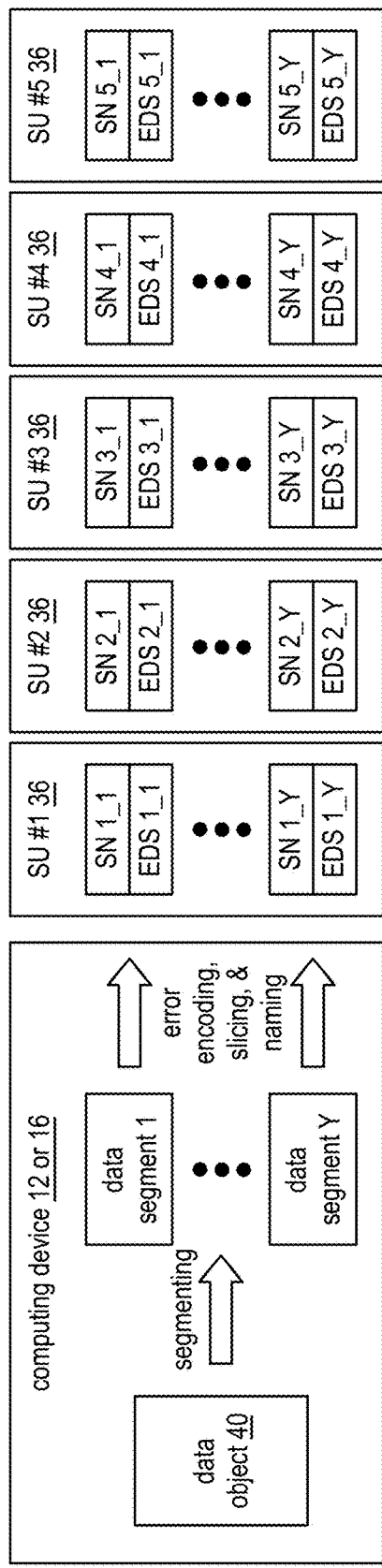
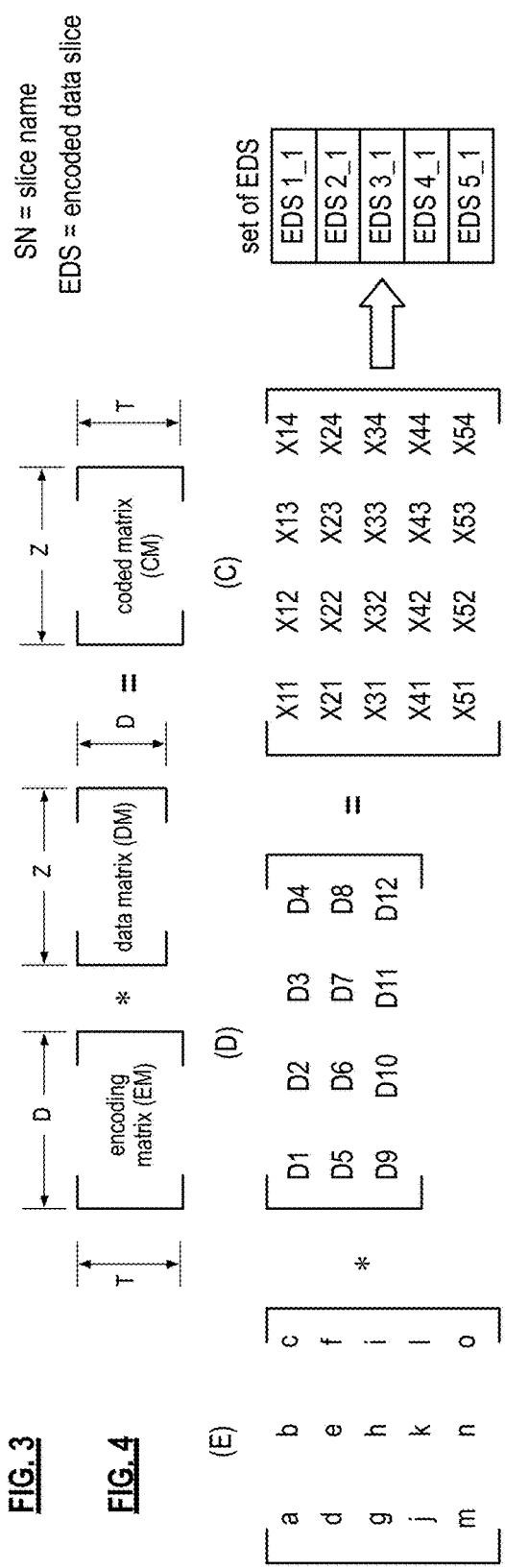
FIG. 3
FIG. 4
FIG. 5
FIG. 6

FIG. 9

| SU #1 36 | SU #2 36 | SU #3 36 | SU #4 36 | SU #5 36 |
|---|---|---|---|---|
| MD #1 100 | MD #1 100 | MD #1 100 | MD #1 100 | MD #1 100 |
| MD #2 100 | MD #2 100 | MD #2 100 | MD #2 100 | MD #2 100 |
| MD #3 100 | MD #3 100 | MD #3 100 | MD #3 100 | MD #3 100 |
| MD #4 100 | MD #4 100 | MD #4 100 | MD #4 100 | MD #4 100 |
| MD #5 100 | MD #5 100 | MD #5 100 | MD #5 100 | |
| MD #6 100 | MD #6 100 | | | |

FIG. 10A

| MD #1 100 | zone assignment | zone size |
|---|---|---|
| zone 1 | writes | 256MB |
| zone 2 | writes | 256MB |
| zone 3 | compaction | 256MB |
| zone 4 | writes | 256MB |
| zone 5 | writes | 256MB |
| ••• | ••• | ••• |
| zone n | compaction | 256MB | t1

| MD #1 100 | zone assignment | zone size |
|---|---|---|
| zone 1 | writes | 256MB |
| zone 2 | writes | 256MB |
| zone 3 | compaction | 128MB |
| zone 4 | writes | 256MB |
| zone 5 | writes | 256MB |
| ••• | ••• | ••• |
| zone n | compaction | 512MB | t2

FIG. 10B

| MD #1 100 | zone assignment | zone size |
|---|---|---|
| zone 1 | writes | 256MB |
| zone 2 | writes | 256MB |
| zone 3 | compaction | 256MB |
| zone 4 | writes | 256MB |
| zone 5 | writes | 256MB |
| ••• | ••• | ••• |
| zone n | compaction | 256MB | t1

| MD #1 100 | zone assignment | zone size |
|---|---|---|
| zone 1 | writes | 128MB |
| zone 2 | writes | 128MB |
| zone 3 | writes | 128MB |
| zone 4 | writes | 128MB |
| zone 5 | compaction | 256MB |
| ••• | ••• | ••• |
| zone n | compaction | 256MB | t2

| zone | zone assignment | zone status |
|---|---|---|
| zone 1 | writes | full |
| zone 2 | writes | pending recovery |
| zone 3 | compaction | unallocated |
| zone 4 | writes | pending write |
| zone 5 | compaction | error |
| ... | ... | ... |
| zone n | compaction | full |

MD #3 100 (at t2)

| zone | zone assignment | zone status |
|---|---|---|
| zone 1 | writes | full |
| zone 2 | writes | unallocated |
| zone 3 | compaction | partial |
| zone 4 | writes | full |
| zone 5 | compaction | error |
| ... | ... | ... |
| zone n | compaction | full |

| zone | zone assignment |
|---|---|
| zone 1 | high priority EDSs |
| zone 2 | low priority EDSs |
| zone 3 | high priority EDSs |
| zone 4 | low priority EDSs |
| zone 5 | HP EDS compaction |
| ... | ... |
| zone n | LP EDS compaction |

MD #1 100 (at t2) — zone 3: error pending-recovery

| zone | |
|---|---|
| zone 1 | |
| zone 2 | |
| zone 3 | |
| zone 4 | |
| zone 5 | |
| ... | |
| zone n | |

MD #1 100 (at t3)

| zone | zone assignment |
|---|---|
| zone 1 | high priority EDSs |
| zone 2 | low priority EDSs |
| zone 3 | low priority EDSs |
| zone 4 | low priority EDSs |
| zone 5 | HP EDS compaction |
| ... | ... |
| zone n | LP EDS compaction |

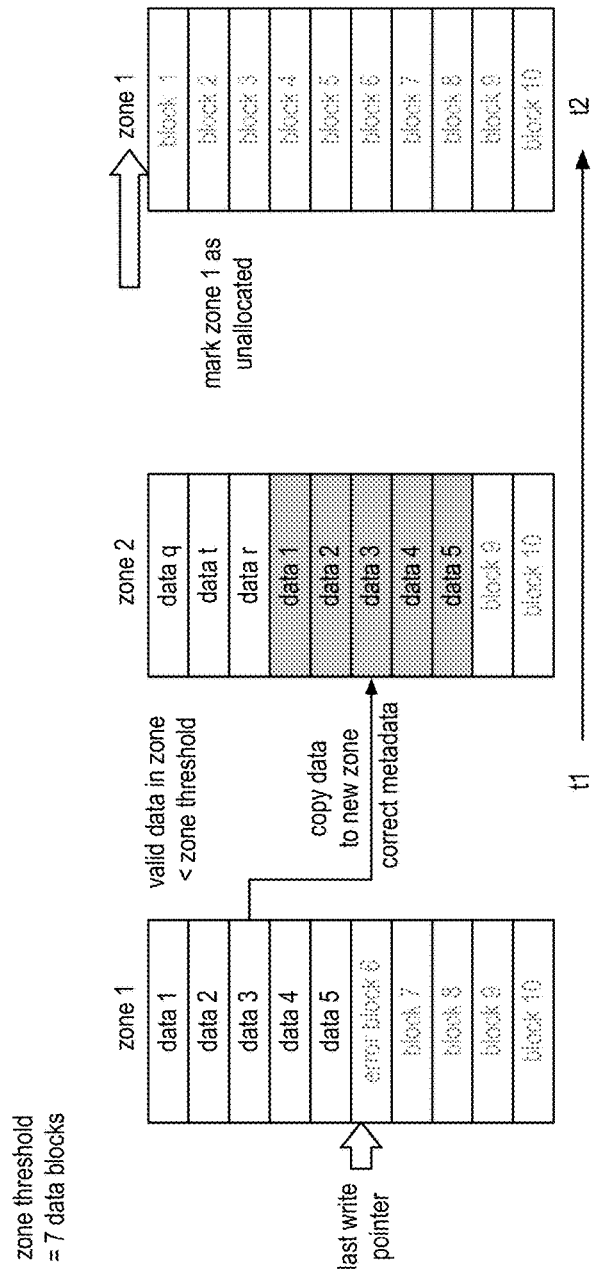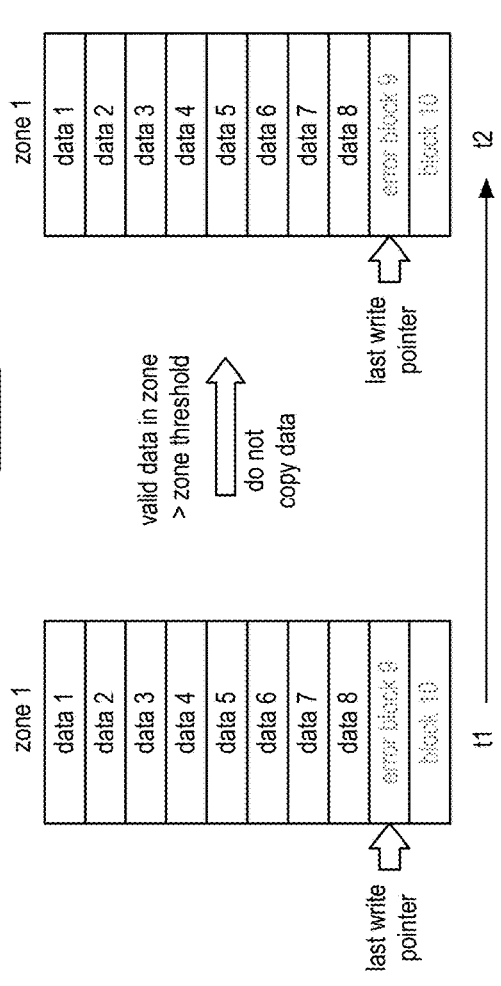
FIG. 12A
FIG. 12B

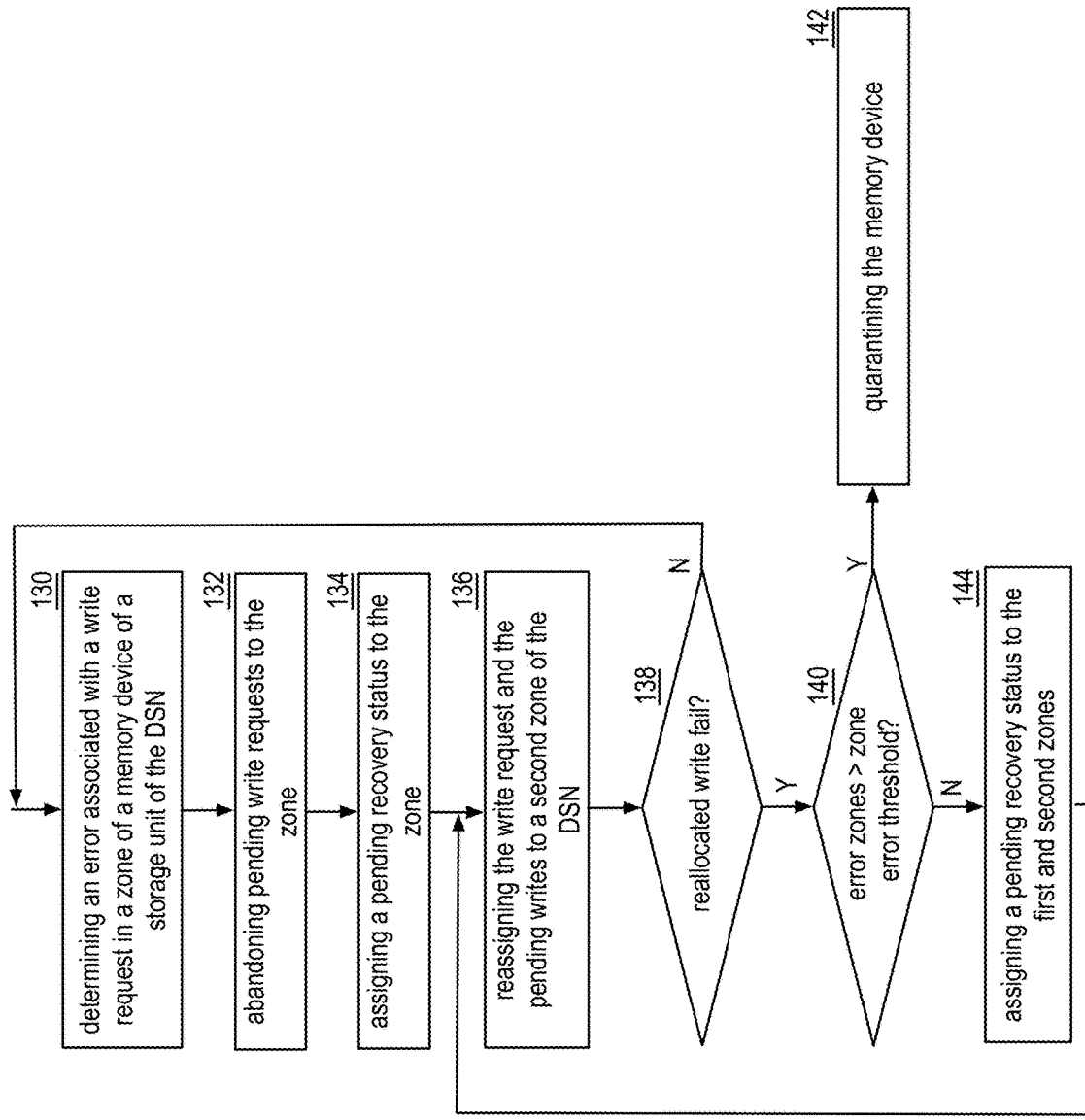

APPLICATION STORAGE SEGMENTATION REALLOCATION

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to storage and retrieval of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 9 is a schematic block diagram of an embodiment of a set of storage units 36 of a dispersed storage network (DSN) in accordance with the present invention;

Figure 11:
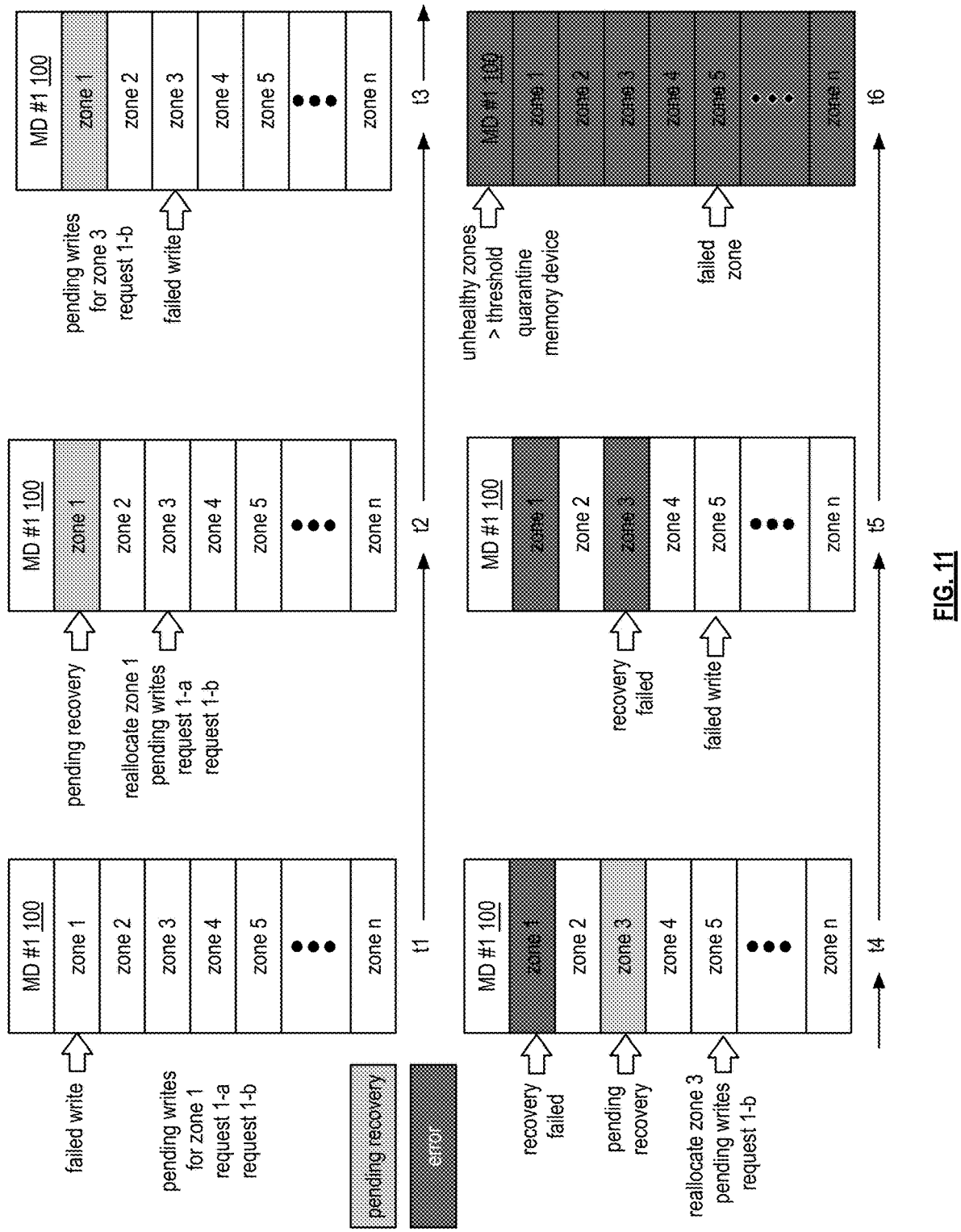
Figure 14:
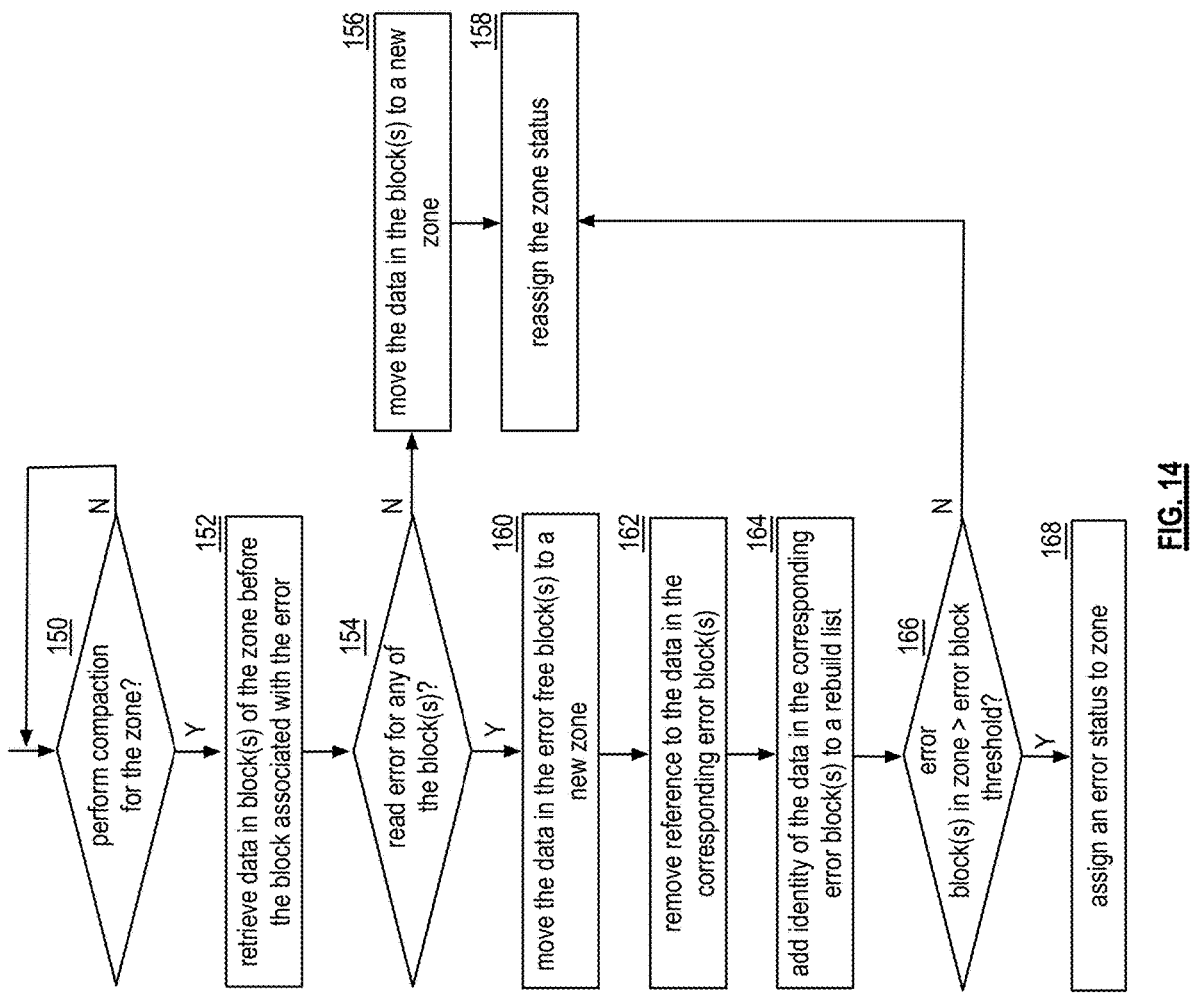

FIGS. 10A-D are schematic block diagrams of memory device allocation tables in accordance with the present invention;

FIG. 11 is a schematic block diagram of an example of storage segmentation reallocation of a memory device of a dispersed storage network in accordance with the present invention;

FIGS. 12A-12D are a schematic block diagrams of examples of a compaction process for a zone of a memory device in accordance with the present invention;

FIG. 13 is a flowchart illustrating an example of a method of storage segment reallocation in accordance with the present invention; and FIG. 14 is a flowchart illustrating an example of a method of a recovering a zone of a memory device in accordance with the present invention.

DETAILED DESCRIPTION OF THE INVENTION

Figure 1:
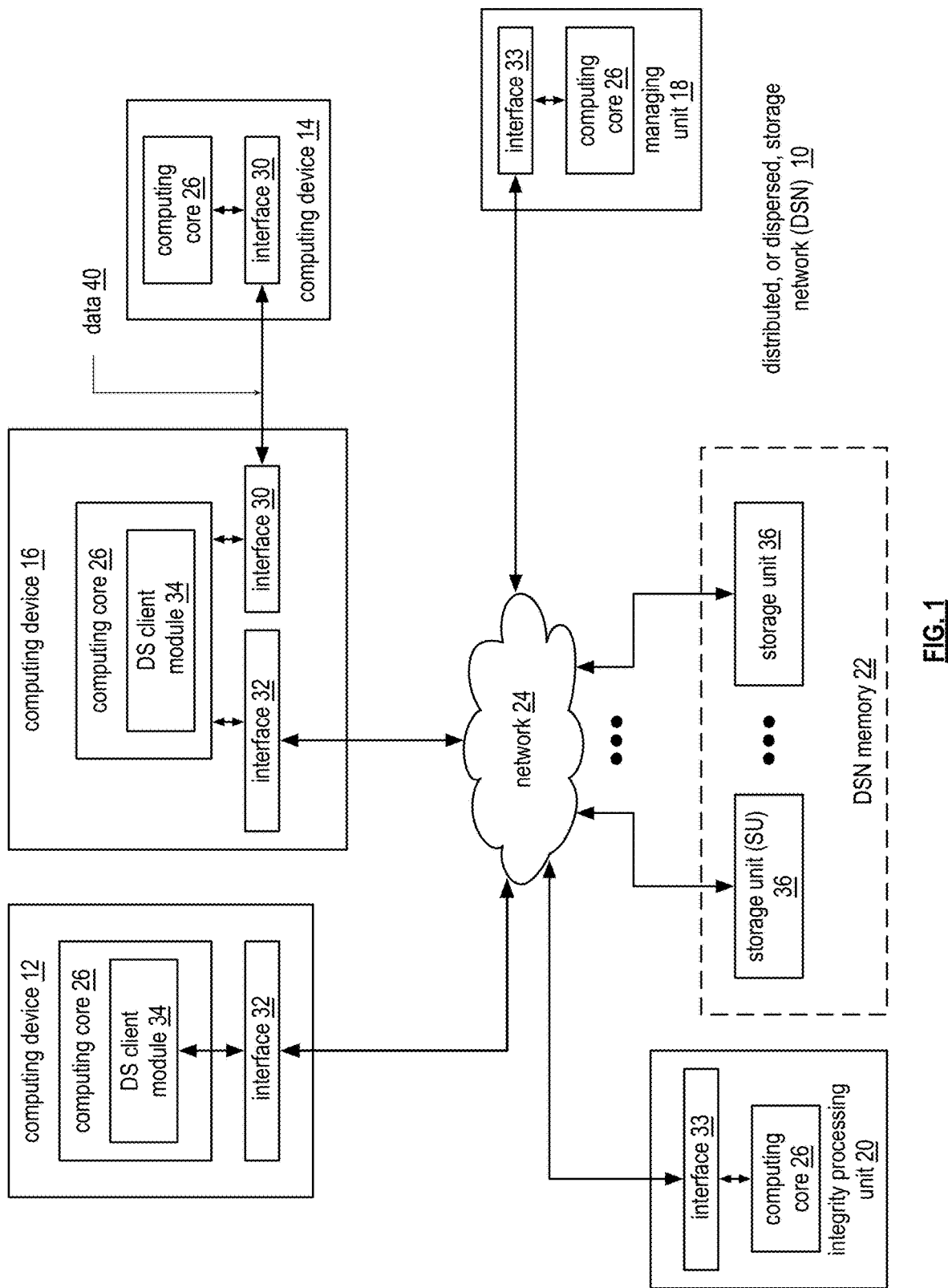
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
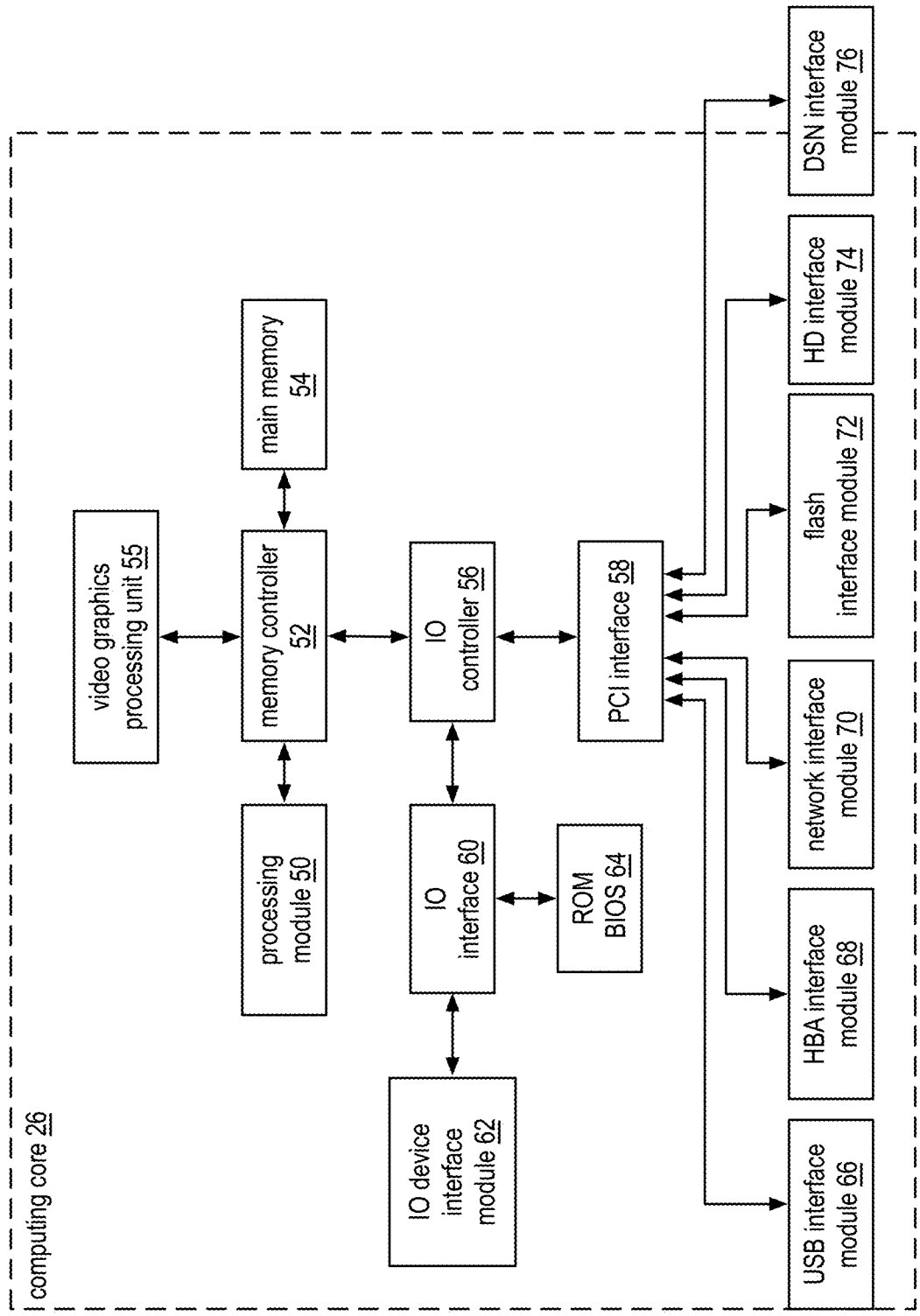
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data (e.g., data 40) on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
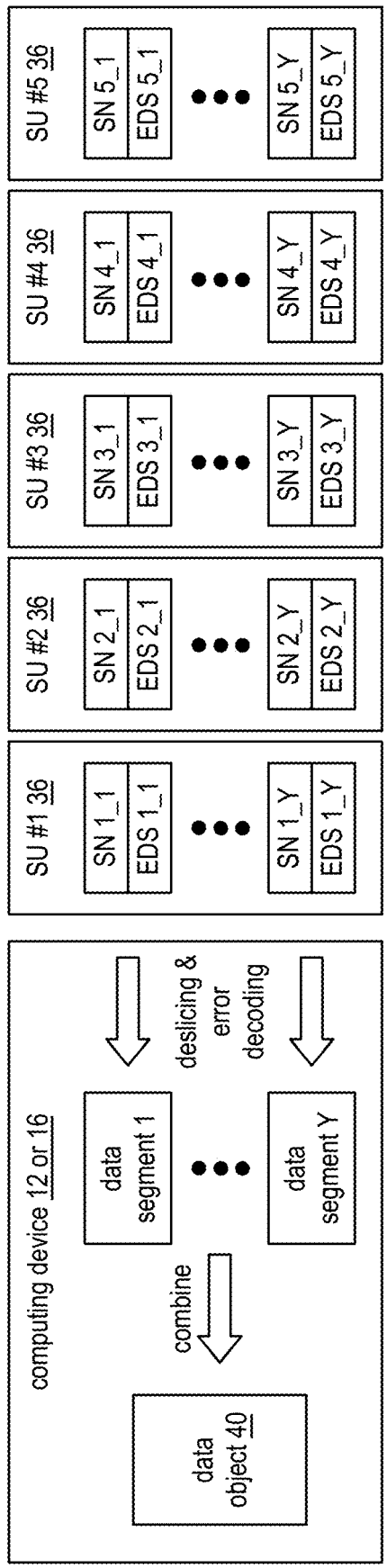
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
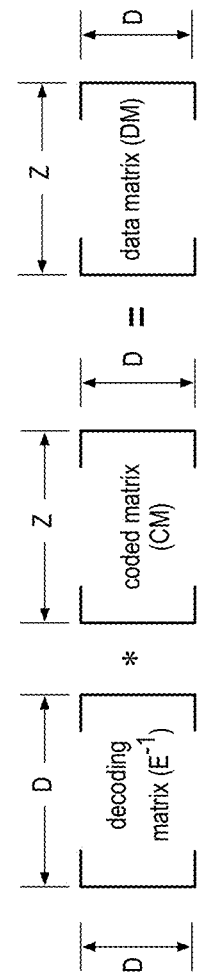
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

FIG. 9 is a schematic block diagram of an embodiment of a set of storage units 36 of a dispersed storage network (DSN). Each storage unit of the set of storage units includes "x" number of memory devices (MDs). The "x" number may vary from storage unit 36 to storage unit 36. For example, the first and second storage units 36 include 6 memory devices, the third and fourth storage units include 5 memory devices, and the fifth storage unit 36 includes 4 memory devices. Each memory device of the "x" memory devices of each storage unit is assigned a logical address range of a DSN namespace. The logical address range corresponds to physical addresses of one or more memory devices. Further, the logical address range and/or the physical addresses can be divided into a plurality of fixed or variable size zones.

For example, a ten terabyte (TB) memory device is divided into forty thousand zones, each 256 megabytes (MBs) in size. As another example, at a first time the 10 TB memory device is divided into 40,000 zones, each 256 MBs, and at a second time is divided into 80,000 zones, each 128 MBs. As another example, at a first time the 10 TB memory device has 40,000 zones, each 256 MBs, and at a second time has 20,000 zones, each 512 MBs.

As yet another example, at a first time a 20 TB (e.g., 20,480,000 MBs of storage space) memory device is divided into 40,000 zones, each zone being 512 MBs in size, and at a second time is divided into 80,000 zones, where of the 80,000 zones, 40,000 zones are 128 MB in size, 20,000 zones are 512 MBs in size and 20,000 zones are 256 MBs in size.

Note that each zone is a small fraction of the overall storage capacity of the memory device. For example, for a 10 TB memory device with 20000 zones, each zone is approximately 0.005% of the overall storage space on the memory device. As another example, for a 100 TB memory device with 10,000 zones, each zone is approximately 0.1% of the overall storage space. Note the zones may be smaller or larger in size, but are typically less than 1% of the overall storage space of the memory device. Utilizing smaller zones allows for more error free memory to be available when zones have errors and are removed from use. Note a first zone is in a first logical and physical location of the memory device and the second zone is in a second logical and physical location of the memory device. Further note in one instance, a zone represents a logical address space that maps to physical addresses of the memory device. In another instance, a zone represents the physical addresses of the memory device.

When a write request to a zone of the memory device fails, a computing device of the DSN allocates a new zone and redirects pending write requests for the zone to the new zone. The computing device can also perform compaction or recovery or instruct another device to perform compaction or recovery on the zone. The reallocation, compaction and recovery processes avoid additional network traffic of rebuilding encoded data slice(s) and improves system reliability and resilience.

In one example, the zone includes a set of sequential blocks. For example, a first zone includes 100 sequential blocks and a second zone includes 500 sequential blocks. The blocks may by of different sizes in each zone. For example, the a zone that is 512 MB and has 512 sequential 1 MB blocks. As another example, the zone includes a logical address range that includes 10,000 addresses and has 10,000 sequential blocks, one for each logical address.

Each zone of the plurality of zones of the memory device is assigned a status (e.g., health state). The status includes one or more of unallocated, partial, pending-recovery, pending-write, full and error. An unallocated status indicates the zone does not contain any data and is ready for write requests. A partial status indicates the zone has some data stored in the zone, but can accept write requests for remaining data blocks of the zone or read requests. A pending-recovery status indicates the zone cannot be written to, and that a compaction will be performed on the zone in an attempt to retrieve data from the zone while it is still fresh (e.g., before any further degradation of the memory device causes the data to become corrupt or lost). Alternatively, a recovery process may be performed by reading data near blocks where a write error occurred, and when the reads are successful (e.g., no error), the zone may be reassigned a partial status.

After the compaction process, the zone may then be put back in an unallocated status or be assigned an error status. The error status indicates the zone has one of more write failures than a threshold number of write failures, and/or a number of blocks with an error greater than an error blocks in zone threshold and cannot be used to read or write data. The full status indicates the zone has no more blocks left for writing data (e.g., blocks are storing data and/or associated with a read or write error).

In one example, when a number of unhealthy zones (e.g., error, pending-recovery) of the memory device exceeds an unhealthy zone (e.g., zone error) threshold, a computing device of the DSN determines to quarantine the memory device. The quarantining includes one or more of a read only mode for the memory device, retrieving data from error free zones of the plurality of zones in accordance with the read only mode, storing the data in another memory device of the storage unit, and assigning the memory device as unusable. The determination on whether to quarantine the memory device may further be based on one or more of: determining a number of compaction processes exceed an optimal compaction threshold, determining a number of available memory space is below a memory space threshold and determining an age of the memory device is greater than an optimal age threshold. For example, the computing device determines that 501 compaction processes have been performed which is greater than the optimal compaction threshold of 500, thus the computing device determines to quarantine the memory device.

FIGS. 10A-D are schematic block diagrams of memory device allocation tables. FIG. 10A is an example of a zone allocation table of a memory device of a storage unit of a dispersed storage network (DSN) that includes allocating zones (e.g., logical address range of the memory device, physical addresses range of the memory device) by size and by assignment. The zone allocation table includes a zone assignment field and a zone size field. In this example, at time t1, the third zone is assigned for compaction and is 256 MB in size. At time t2, the third zone has its size changed from 256 MB to 128 MB. The determination of modifying zone allocation may be based on one or more of detecting errors in the memory device, age of the memory device, number of input/output operations of the memory device and number of times at least a portion of the memory device has been rewritten.

FIG. 10B is another example of a zone allocation table of a memory device of the DSN. In this example, both the zone assignment and the zone size are modified from a first time to a second time. As an example of a size allocation change, at time t1, the first zone of the memory device has a zone assignment of writes and a zone size of 256 MB. Thus, the first zone is for initial writing of data to the memory device up to a data size of 256 MB. At time t2, the first zone of the memory device still has a zone assignment of writes, and the zone size has been decreased from 256 MB to 128 MB. As an example of assignment allocation change, at time t1, the fifth zone of the memory device has a zone assignment of writes and a zone size of 256 MB. At time t2, the zone is reallocated from writes to compaction (zone used to store data recovered from other zones) and a size of 256 MB.

FIG. 10C is another example of a zone allocation table of a memory device of the DSN. In this example, the zone allocation table includes a zone assignment field and a zone status field. The zone status indicates the status (e.g., health state) of each zone. For instance, at time t1, the second zone has a zone status of pending recovery. During this state (e.g., having the status), the second zone cannot write further data and is awaiting or undergoing a recovery or compaction process. At time t2, the compaction process has finished and the second zone is empty and ready to accept write requests, thus the zone status is updated to unallocated. The compaction process utilized a portion of zone 3 for storing data moved from zone 2, thus at time t2, zone 3's status is updated to partial. As another instance, at time t1, the fourth zone of the memory device has a pending write status indicating write requests for the zone are currently pending. At time t2, the write requests have been executed and the zone has no more room to store data (e.g., all data blocks are written or have an error). Thus, the zone status is updated to full.

FIG. 10D is another example of a zone allocation table of a memory device of the DSN. In this example, the zone assignment includes a priority level regarding storage of encoded data slices in the zone. In this example, the priority level includes high priority encoded data slices and low priority encoded data slices. However, in other examples, there may be more levels of priority (e.g., low-medium, medium, medium-high, etc.). The priority is based on one or more of decode threshold to pillar width ratio, encryption type, encoding function, access frequency, size, a command, and a type of data (e.g., associated with the encoded data slice).

For example, an encoded data slice has a high priority when the decode threshold to pillar width ratio compares unfavorably (e.g., greater than) to a ratio threshold (e.g., 50%). For instance, a set of encoded data slices that includes the encoded data slice has a decode threshold of 10 and a pillar width of 16, thus the ratio of encoded data slices needed is 10 out of 16 possible encoded data slices, which is 62.5%. In this example, the ratio of 62.5% is greater than the ratio threshold of 50%, thus the encoded data slice is deemed to be high priority. As another instance, a set of encoded data slices that includes the encoded data slice has a decode threshold of 10 and a pillar width of 40, thus the ratio of encoded data slices needed is 10 out of 40 possible encoded data slices, which is 25%. In this example, the ratio of 25% is less than the ratio threshold of 50%, thus the encoded data slice is deemed to be low priority.

As another example of determining the priority, when the encoded data slice includes encryption, it is deemed high priority, and when the encoded data slice does not include encryption, it is deemed low priority. As yet another example, when the expected access frequency of the encoded data slice is greater than an expected access frequency threshold, the encoded data slice is deemed high priority and when the expected access frequency of the encoded data slice is less than the expected access frequency threshold, the encoded data slice is deemed low priority. As yet a further example, the priority is determined by receiving a command with a write request regarding the encoded data slice.

In an example of operation, at time t1, zone 1 and zone 3 are assigned for storage of high priority encoded data slices (EDSs), zones 2 and 4 are assigned low priority EDSs, zone 5 is assigned high priority (HP) EDS compaction, and zone n is assigned low priority (LP) EDS compaction. At time t2, an error (write error, read error) occurs in zone 3. At time t3, the zone 3 error has been resolved and the zone is available to accept write requests. However, in response to the zone error (e.g., number of errors in a zone over a priority write/read error threshold), the zone assignment for zone 3 is changed to low priority EDSs. Reassigning zones by priority increases the probability that high priority encoded data slices will be stored away from problematic areas (a scratch, disk degradation, etc.) of the memory device.

FIG. 11 is a schematic block diagram of an example of storage segmentation reallocation of a memory device of a dispersed storage network. A logical namespace (e.g., addresses) of the memory device 100 is divided into a plurality of zones 1-n (e.g., fixed or variable size). The light grey shading of zones (e.g., zone 1 of t2) indicates the zone has a pending recovery status. The dark grey shading of zones (e.g., zone 1 of t4) indicates the zone has an error status.

In an example of operation, before time t1, the memory device 100 has pending writes (e.g., request 1-a, request 1-b) for zone 1. At or during time t1, request 1-a fails. For example, the write request failed due to a transient error (e.g., a build-up of lube, a dust particle, an undesired temperature, a vibration, etc.). As another example, the write request failed due to a non-transient error (e.g., scratch on a disk, degradation of memory, etc.).

When the write request fails, a computing device of the DSN reallocates the pending writes of zone 1 to one or more other zones. For example, during time t2, the computing device reallocates failed write request 1-a and pending write request 1-b to zone 3 of the memory device 100. The computing device may also assign an updated status to zone 1 (the zone where the error occurred). For example, when the zone has been involved in a number of errors (e.g., a write error threshold number of failed writes or greater), the zone's status is updated to pending recovery. Alternatively, when a majority of blocks are already in use (e.g., block 97 of 100 failed the write request), and the zone has been involved in the number of errors, the status of zone 1 may be updated to full.

When a zone is assigned a pending recovery status, a recovery or compaction process is initiated. The recovery process reads at least some of the data in blocks of the zone before the last write pointer (e.g., x number of blocks from where the error occurred), when the reads are successful, the status of the zone is updated (e.g., to partial). When a number of unsuccessfully read blocks is more than a read block error threshold, then the zone is updated to error. The compaction process reads all of the data in the blocks of the zone before the error block, copies the data that was successfully read to a new zone, and corrects metadata. For example, the metadata corresponding to successfully read blocks is updated to include corresponding blocks of zone 3 as the storage location and the unsuccessfully read blocks have their metadata reference removed. When the compaction process is finished, the status of the zone is updated to unallocated, unless the number of unsuccessfully read blocks is more than a read block error threshold, then the zone is updated to error. Note the computing device may determine to perform both the compaction and recovery processes before reassigning a zone status.

During time t3, the write request 1-a is successfully executed in zone 3 of the memory device 100, but the write request 1-b fails. The pending write (request 1-b) is reallocated to zone 5 of the memory device. During time t4, the computing device determines that the recovery and/or compaction of zone 1 fails, thus zone 1 is assigned an error status. Zone 3 is assigned pending recovery and a compaction process is initiated. The computing device then determines whether to quarantine the memory device. The determination on whether to quarantine the memory device is based on one or more of: when a number of unhealthy zones (e.g., pending recovery, error) is greater than an unhealthy zone threshold of the memory device; determining a number of compaction processes exceed an optimal compaction threshold, determining a number of available memory space is below a memory space threshold and determining an age of the memory device is greater than an optimal age threshold. For example, the unhealthy zone threshold for memory device 100 is 3 zones. The computing device determines the number of unhealthy zones (e.g., zone 1 and zone 3 are unhealthy (e.g., error or pending recovery) are less than the unhealthy zone threshold and thus determines not to quarantine the memory device.

At time t5, the compaction process failed (e.g., unsuccessful reads over a read block error threshold) and the write request 1-*b* is attempted and fails and the status of zone 5 is updated to error (e.g., number of write failures to zone 5 is greater than a write error threshold). The status for zone 3 is updated to error. During time t6, the computing device then again determines whether to quarantine the memory device. In this example, the computing device determines the number of unhealthy zones (e.g., zone 1 and zone 3, and zone 5) is greater than or equal to the unhealthy zone threshold and thus determines to quarantine the memory device.

FIG. 12A is a schematic block diagram of an example of a compaction process for a zone of a memory device of a storage unit of a dispersed storage network (DSN). In this example, zone 1 has a status of pending recovery and a computing device of the DSN has determined to perform a compaction on zone 1. In one example, the determination is based on the amount of valid data in the zone being less than a zone threshold (e.g., 30% of size of zone, less than a certain number of data blocks of zone, etc.). Having determined to perform the compaction process, the computing device reads data in blocks before the last write pointer. For instance, during time t1, the computing device reads data 1-5 and copies data 1-5 to blocks 4-8 of zone 2. Alternatively, the computing copies data 1-5 to a zone that currently has no data stored. The computing device then updates the metadata for data 1-5 and assigns zone 1 a status of unallocated.

FIG. 12B is a schematic block diagram of another example of a compaction process of a zone of a memory device of a dispersed storage network (DSN). In this example, the zone 1 has a status of pending recovery and a computing device of the DSN has determined to not perform a compaction on zone 1. In one example, the determination is based on the amount of valid data in the zone being greater than a zone threshold (e.g., 70% of size of zone, greater than a certain number of data blocks (e.g., 7) of zone, etc.). Since the computing device did not determine to perform the compaction, the computing device does not copy data to a new zone.

In one embodiment, the computing device determines to perform a recovery process by reading the data before the last write pointer and determining whether a number of valid data blocks in the zone exceed a valid data block in zone threshold. When the number of valid data blocks exceed the valid data block in zone threshold, the computing device updates the status to partial. When the number of valid data blocks does not exceed the valid data block in zone threshold, the computing device updates the status to error. Alternatively, when the number of valid data blocks does not exceed the valid data block in zone threshold, the computing device determines to perform a compaction process based on the updated number of valid data blocks being less than the zone threshold.

Figure 12C:
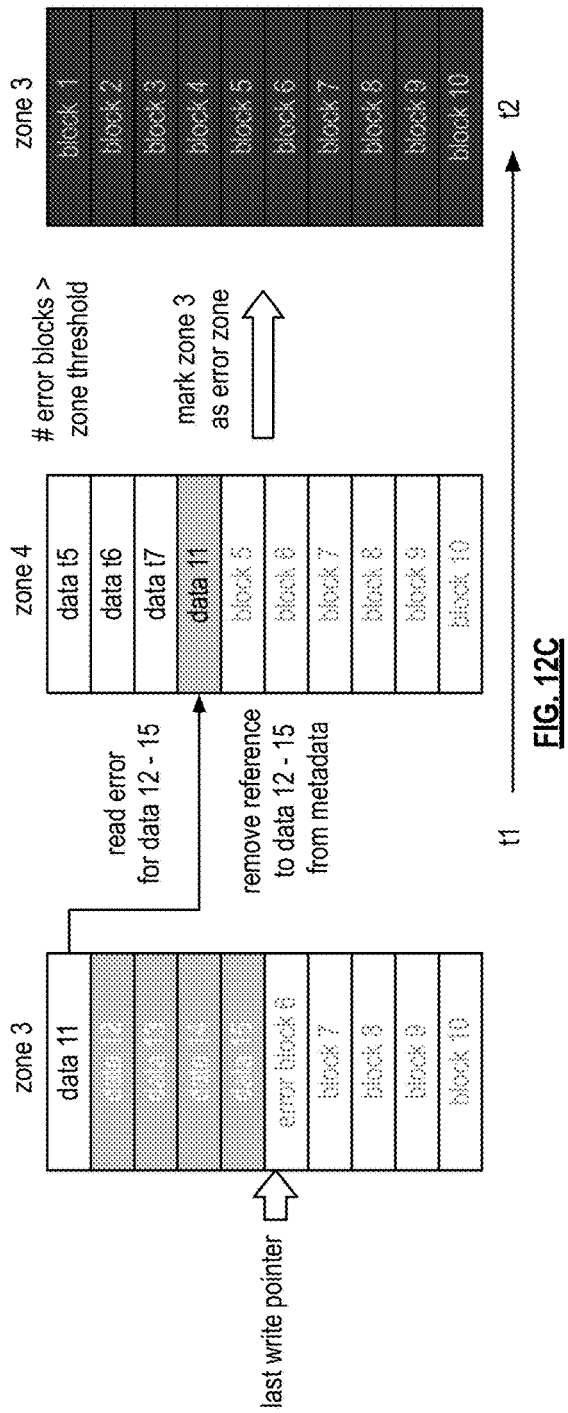

FIG. 12C is a schematic block diagram of another example of a compaction process of a zone of a memory device of a storage unit of a dispersed storage network (DSN). In this example, at time t1, a computing device of the DSN performs a compaction process on zone 3 of the memory device. The computing device attempts to read data from blocks 1-5 of zone 3 and copy them to zone 4. However, the computing device determines there is a read error for data 12-15 stored in blocks 2-5 of zone 3. The computing device copies data 11 to block 4 of zone 4 and updates the metadata associated with data 11 based on the updated storage location. The computing device removes the reference to data 12-15 from metadata. In one example, the computing device further updates a rebuild list to include identities (e.g., slice names) of encoded data slices associated with data 12-15. The computing device then determines the number of errors for the zone exceed a zone threshold and assigns zone 3 a status of error. Alternatively, when the number of errors do not exceed the zone threshold, the computing device may assign a status of unallocated to zone 3.

Figure 12D:
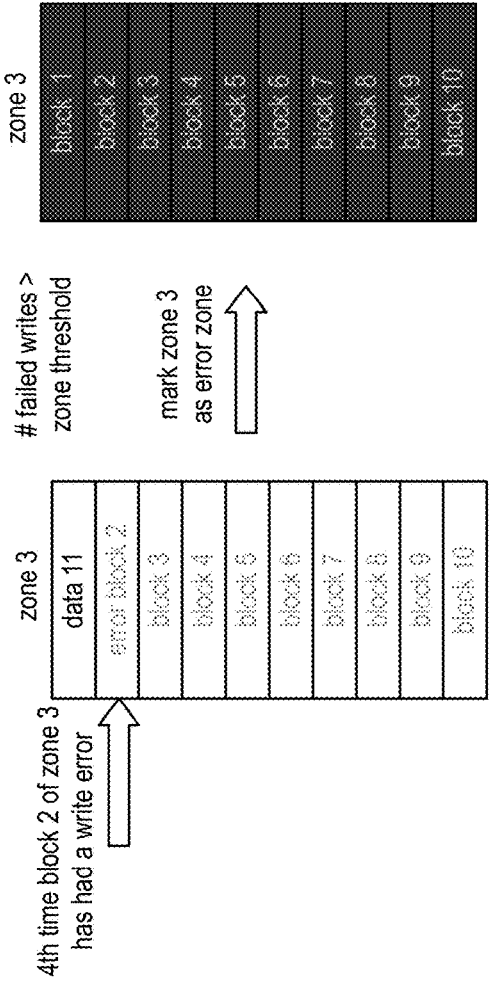

FIG. 12D is a schematic block diagram of another example of a compaction process of a zone of a memory device of a dispersed storage network (DSN). In this example, a computing device of the DSN determines that a write request for zone 3 has failed. The computing device further determines that this is the fourth time that zone 3 is associated with a failed write and that the zone threshold for failed writes is 3. The computing device then assigns an error status to zone 3. Alternatively, the computing device may determine that the number of times that zone 3 has undergone a compaction process has exceeded a zone compaction threshold. Further note, from zone to zone, the various thresholds described herein may vary. For example, zone 4 of memory device 100 may have a failed write threshold of 7 and a compaction threshold of 2.

FIG. 13 is a flowchart illustrating an example of a method of storage segment reallocation. The method begins or continues with step 140, where a computing device of a dispersed storage network (DSN) determines an error with a first write request in a first zone of a plurality of zones of a memory device of a storage unit of the DSN. Note the first zone includes a first set of sequential blocks for storing data, where the first set of sequential blocks are in a first logical and physical location of the memory device. In this example, the error occurred in a block of the first set of sequential blocks, where the first write request is regarding an encoded data slice of a set of encoded data slices to be stored in the block, and where a data segment of data is dispersed storage error encoded to produce the set of encoded data slices. The method continues with step 132, where the computing device abandons pending write requests to the first zone, where the pending write requests includes the first write request.

The method continues with step 134, where the computing device abandons pending write requests to the first zone. The method continues with step 136, where the computing device reassigns the first write request to a second zone of the memory device, where the second zone includes a second set of sequential blocks, and where the second set of sequential blocks are in a second logical and physical location of the memory device.

The method continues with step 138, where the computing device determining whether the reassigned write request in the second zone has the error. When the reassigned write request has the error, the computing device abandons second pending write requests to the second zone, where the second pending write requests includes the reassigned write request, and assigns a pending recovery status to the second zone, where when the second zone has the pending recovery status, the second zone is in a read only mode. Further when the reassigned write request in the second zone has the error, the method continues with step 140. When the reassigned write request does not have the error, the method loops back to step 130, or ends.

The method continues with step 140, where the computing device determines whether a number of zones of the plurality of zones associated with the error exceeds a zone error threshold. When the number of zones of plurality of zones associated with the error exceeds a zone error threshold, the method continues with step 142, where the computing device quarantines the memory device. The quarantining includes one or more of a read only mode for the memory device, retrieving data from error free zones of the plurality of zones in accordance with the read only mode, storing the data in another memory device of the storage unit, and assigning the memory device as unusable.

When the number of zones of the plurality of zones associated with the error does not exceed a zone error threshold, the method continues with step 144, where the computing device assigns a pending recovery status to the second zone (e.g., or corresponding zone that had a reallocated write failure). The method then loops back to step 136, where the computing device reassigns the reassigned write request to a next zone (e.g., a third zone of the plurality of zones), where the next zone is in another physical and logical location of the memory device than previous failed write attempts for the write request.

FIG. 14 is a flowchart illustrating an example of a method of a recovering a zone of a memory device of a dispersed storage network (DSN). The method begins or continues with step 150, where a computing device of the DSN determines whether to perform compaction on the zone. The determination is based on one or more of determining a compaction ranking for the zone based on a ranking of zones with a pending recovery status, and comparing an amount of valid data blocks in the zone to an amount unused available data blocks in the zone.

When determining to not perform compaction on the zone, the method loops back to step 150. When determining to perform compaction on the zone, the method continues with step 152, where the computing device retrieves data in blocks of the first set of sequential blocks that precede the block associated with the write error. The method continues with step 154, where the computing device determines whether there is a first read error associated with the retrieving the data. When there is not the first read error, the method continues to step 156, where the computing device moves the retrieved data in another zone of the plurality of zones. The method continues with step 158, where the computing device reassigns the status of the zone (e.g., partial, unallocated). Note when the zone has the partial or unallocated status, write requests to the zone are allowed.

When there is the first read error, the method continues to step 160, where the computing device moves (e.g., stores, commands to be stored, etc.) the retrieved data (e.g., encoded data slices from the error free blocks) that does not have the first read error to the other zone. The method continues with step 162, where the computing device removes a pointer from metadata to a corresponding encoded data slice stored in a corresponding error block of the DSN. The method continues with step 164, where the computing device adds an identity of the corresponding encoded data slice to a rebuild list. The method continues with step 166, where the computing device determines whether a number of error blocks of the first set of sequential blocks exceeds an error block threshold for the first zone. When the number of blocks of the first set of sequential blocks exceeds the error block threshold, the method continues to step 168, where the computing device assigns an error status to the first zone. When the number of blocks of the first set of sequential blocks does not exceed the error block threshold, the method continues to step 158.

Note a computer readable storage medium that includes one or more elements that store operational instructions that when executed by a processing module of a computing device, is operable to perform any of the above methods.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device of a dispersed storage network (DSN) comprises:
    determining an error with a first write request in a first zone of a plurality of zones of a memory device of a storage unit of the DSN, wherein the first zone includes a first set of sequential blocks, wherein the first set of sequential blocks are in a first logical and physical location of the memory device, wherein the error occurred in a block of the first set of sequential blocks, wherein the first write request is regarding an encoded data slice of a set of encoded data slices to be stored in the block, and wherein a data segment of data is dispersed storage error encoded to produce the set of encoded data slices;

abandoning pending write requests to the first zone, wherein the pending write requests includes the first write request;
reassigning the first write request to a second zone of the memory device, wherein the second zone includes a second set of sequential blocks, and wherein the second set of sequential blocks are in a second logical and physical location of the memory device;
determining, for a zone of the plurality of zones that has a pending recovery status, whether to perform a compaction process; and
when determining to perform the compaction process:
retrieving encoded data slices stored in blocks of the first set of sequential blocks that precede the block associated with the error.

2. The method of claim 1 further comprises:
determining whether the reassigned first write request in the second zone has the error; and
when the reassigned first write request has the error:
abandoning second pending write requests to the second zone, wherein the second pending write requests includes the reassigned write request; and
assigning a pending recovery status to the second zone, wherein when the second zone has the pending recovery status, the second zone is in a read only mode.

3. The method of claim 2 further comprises:
determining whether a number of zones of the plurality of zones associated with the error exceeds a zone error threshold; and
when the number of zones of the plurality of zones associated with the error exceeds the zone error threshold, quarantining the memory device, wherein the quarantining includes one or more of a read only mode for the memory device, retrieving data from error free zones of the plurality of zones in accordance with the read only mode, storing the data in another memory device of the storage unit, and assigning the memory device as unusable.

4. The method of claim 3 further comprises:
when the number of zones of the plurality of zones associated with the error does not exceed the zone error threshold:
reassigning the reassigned write request to a third zone of the plurality of zones, wherein the third zone is in a third physical and logical location of the memory device.

5. The method of claim 1, wherein the reassigning further includes:
reassigning the pending write requests to the second zone of the memory device.

6. The method of claim 1, wherein the reassigning further includes:
reassigning a second write request of the pending write requests to a third zone of the plurality of zones, wherein the third zone is in a third physical and logical location of the memory device.

7. The method of claim 1 further comprises:
assigning a pending recovery status to the first zone, wherein when the first zone has the pending recovery status, the first zone is in a read only mode.

8. The method of claim 1 further comprises:
determining whether there is a first read error in corresponding blocks associated with the retrieving the encoded data slices; and
when there is not the first read error, storing the retrieved encoded data slices in another zone of the plurality of zones, and assigning the zone as unallocated, wherein when the zone has the unallocated status, the zone is empty and write requests to the zone are allowed.

9. The method of claim 8 further comprises:
when there is the first read error, storing the retrieved encoded data slices that do not have the first read error in the other zone and removing a pointer from metadata to corresponding encoded data slices stored in the corresponding blocks of the DSN; and
adding an identity of the corresponding encoded data slices to a rebuild list.

10. The method of claim 9 further comprises:
determining whether a number of the corresponding blocks of the first set of sequential blocks exceeds an error block threshold for the zone; and
when the number of the corresponding blocks of the first set of sequential blocks exceeds the error block threshold, assigning an error status to the first zone; and
when the number of corresponding blocks of the first set of sequential blocks does not exceed the error block threshold, assigning a partial status to the first zone, wherein when the zone has the partial status, the zone is storing at least one encoded data slice and write requests to the zone are allowed.

11. A computer readable storage device comprises:
a first memory element that stores operational instructions, that when executed by a computing device of a dispersed storage network (DSN), cause the computing device to:
determine an error with a first write request in a first zone of a plurality of zones of a memory device of a storage unit of the DSN, wherein the first zone includes a first set of sequential blocks, wherein the first set of sequential blocks are in a first logical and physical location of the memory device, wherein the error occurred in a block of the first set of sequential blocks, wherein the first write request is regarding an encoded data slice of a set of encoded data slices to be stored in the block, and wherein a data segment of data is dispersed storage error encoded to produce the set of encoded data slices;
a second memory element that stores operational instructions, that when executed by the computing device, cause the computing device to:
abandon pending write requests to the first zone, wherein the pending write requests includes the first write request; and
a third memory element that stores operational instructions, that when executed by the computing device, cause the computing device to:
reassign the first write request to a second zone of the memory device, wherein the second zone includes a second set of sequential blocks, and wherein the second set of sequential blocks are in a second logical and physical location of the memory device;
a fourth memory element that store operational instructions, that when executed by the computing device, cause the computing device to:
determine, for a zone of the plurality of zones that has a pending recovery status, whether to perform a compaction process; and
when determining to perform the compaction process:
retrieve encoded data slices stored in blocks of the first set of sequential blocks that precede the block associated with the error;
determine whether there is a first read error in corresponding blocks associated with the retrieving the encoded data slices; and when there is not the first read error, store the retrieved encoded data slices in another zone of the plurality of zones.

12. The computer readable storage device of claim 11 further comprises:
a fifth memory element that stores operational instructions, that when executed by the computing device, cause the computing device to:
determine whether the reassigned first write request in the second zone has the error; and
when the reassigned first write request has the error:
abandon second pending write requests to the second zone, wherein the second pending write requests includes the reassigned write request; and
assign a pending recovery status to the second zone, wherein when the second zone has the pending recovery status, the second zone is in a read only mode.

13. The computer readable storage device of claim 12 further comprises:
a sixth memory element that stores operational instructions, that when executed by the computing device, cause the computing device to:
determine whether a number of zones of the plurality of zones associated with the error exceeds a zone error threshold; and
when the number of zones of the plurality of zones associated with the error exceeds the zone error threshold, quarantine the memory device, wherein the quarantining includes one or more of a read only mode for the memory device, retrieving data from error free zones of the plurality of zones in accordance with the read only mode, storing the data in another memory device of the storage unit, and assigning the memory device as unusable.

14. The computer readable storage device of claim 13, wherein the sixth memory element stores further operational instructions, that when executed by the computing device, cause the computing device to:
when the number of zones of the plurality of zones associated with the error does not exceed the zone error threshold:
reassign the reassigned write request to a third zone of the plurality of zones, wherein the third zone is in a third physical and logical location of the memory device.

15. The computer readable storage device of claim 11, wherein the third memory element stores further operational instructions, that when executed by the computing device, cause the computing device to perform the reassigning by:
reassigning the pending write requests to the second zone of the memory device.

16. The computer readable storage device of claim 11, wherein the third memory element stores further operational instructions, that when executed by the computing device, cause the computing device to perform the reassigning by:
reassigning a second write request of the pending write requests to a third zone of the plurality of zones, wherein the third zone is in a third physical and logical location of the memory device.

17. The computer readable storage device of claim 11 further comprises:
a fifth memory element that stores operational instructions, that when executed by the computing device, cause the computing device to:
assign a pending recovery status to the first zone, wherein when the first zone has the pending recovery status, the first zone is in a read only mode.

18. The computer readable storage device of claim 11 further comprises:
operational instructions, that when executed by the computing device, cause the computing device to:
when there is not the first read error, assign the zone as unallocated, wherein when the zone has the unallocated status, the zone is empty and write requests to the zone are allowed.

19. The computer readable storage device of claim 18 further comprises:
a fifth memory element that stores operational instructions, that when executed by the computing device, cause the computing device to:
when there is the first read error, store the retrieved encoded data slices that do not have the first read error in the other zone and removing a pointer from metadata to corresponding encoded data slices stored in the corresponding blocks of the DSN; and
add an identity of the corresponding encoded data slices to a rebuild list.

20. The computer readable storage device of claim 19 further comprises:
a sixth memory element that stores operational instructions, that when executed by the computing device, cause the computing device to:
determine whether a number of the corresponding blocks of the first set of sequential blocks exceeds an error block threshold for the zone; and
when the number of the corresponding blocks of the first set of sequential blocks exceeds the error block threshold, assign an error status to the first zone; and
when the number of corresponding blocks of the first set of sequential blocks does not exceed the error block threshold, assign a partial status to the first zone, wherein when the zone has the partial status, the zone is storing at least one encoded data slice and write requests to the zone are allowed.

* * * * *